Feb. 17, 1970     J. H. WEGGELAND     3,495,345
PICTURE VIEWER
Filed May 12, 1967     2 Sheets-Sheet 1
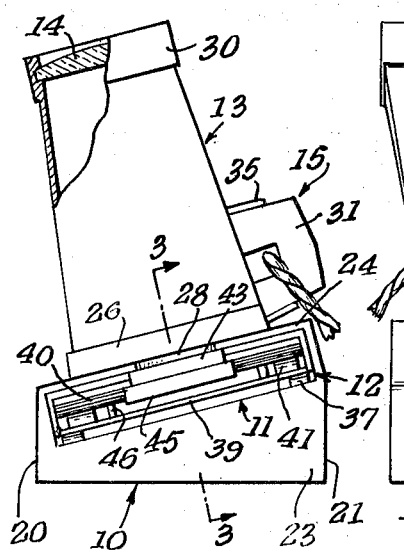
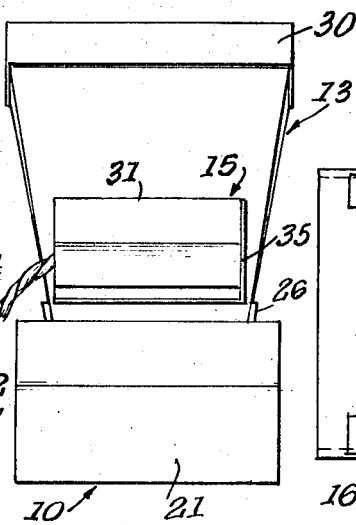
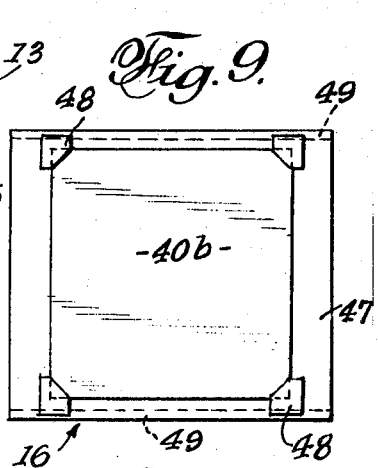
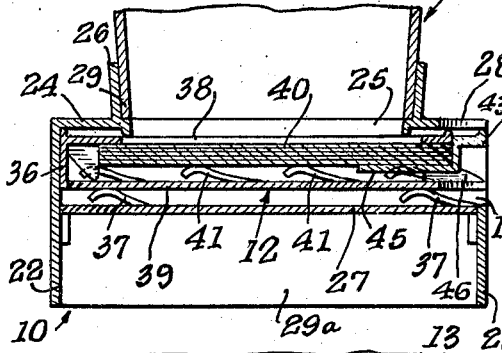
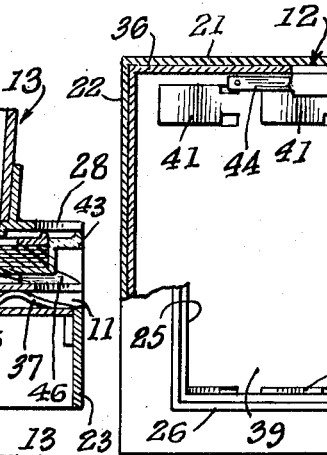
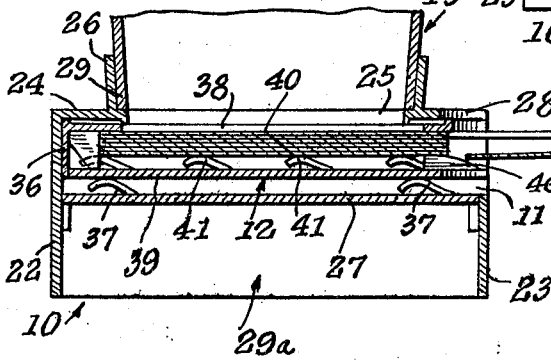
INVENTOR.
JOHN H. WEGGELAND
BY
C. G. Stratton
ATTORNEY

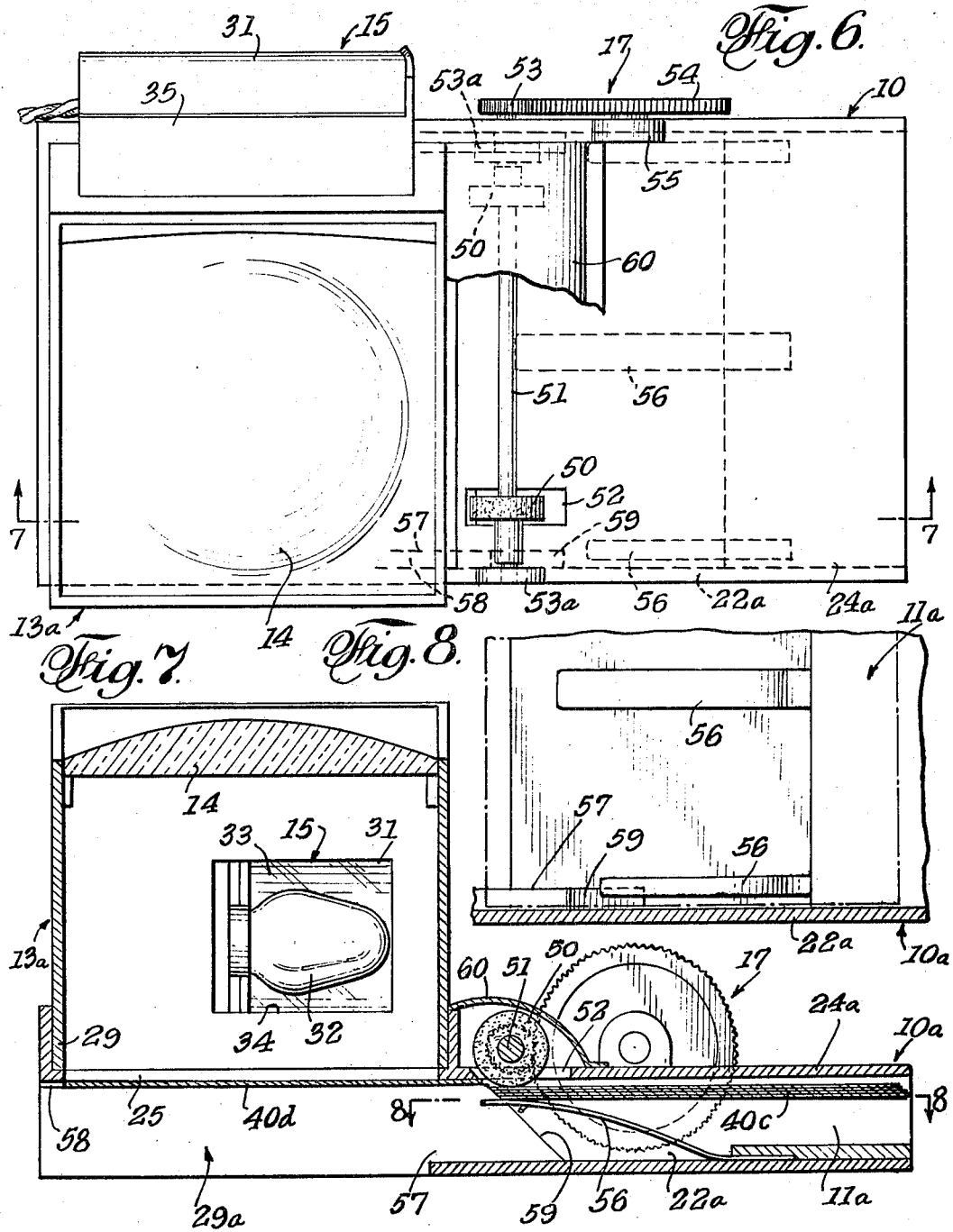

United States Patent Office 3,495,345
Patented Feb. 17, 1970

3,495,345
PICTURE VIEWER
John H. Weggeland, Los Angeles, Calif.
(202 E. Bougainvillea Road, Lehigh Acres, Fla. 33936)
Filed May 12, 1967, Ser. No. 638,087
Int. Cl. G09f 11/30, 13/10
U.S. Cl. 40—63      3 Claims

ABSTRACT OF THE DISCLOSURE

A viewer for pictures or snapshots that has a cavity to accept single pictures as well as a picture changer for sequential viewing of a plurality of pictures through an enlarging lens, and is adapted to store a large number of prints that need not be disturbed or removed while pictures are being viewed. The viewer may be provided with finger-operable means for feeding pictures from a stack placed in said cavity and retained by spring tension.

CROSS-REFERENCES TO RELATED APPLICATIONS

My pending application, Ser. No. 554,340, now Patent No. 3,377,727, discloses a picture changer having a shuttle-type operation that removes the top picture of a stack, to expose the picture therebeneath for viewing, and returns said removed picture to the bottom of the stack. Said changer constitutes one preferred means for effecting sequential viewing of the pictures of a stack thereof and adapted to be removably disposed in the cavity above mentioned.

BACKGROUND OF THE INVENTION

Prints are ordinarily viewed while held in the hand and, with time, become disarranged, dirtied and otherwise deleteriously affected. Also, such prints or snapshots are ordinarily viewed at their normal size. While enlarging viewers for transparencies have been provided in various forms, there is not presently available a commercial viewer for a stack of prints or snapshots that can be adapted to view the items of such a stack in sequence, as well as adapted to view single prints or snapshots fed manually, and which provides illuminated and enlarged dimensional effects more striking than when the viewer is not used. The present viewer embodies the foregoing characteristics as well as being adapted to store a large number of prints, one hundred or more, for ready availability.

This invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description, which is based on the accompanying drawings. However, said drawings merely show, and the following description merely describes, preferred embodiments of the present invention, which are given by way of illustration or example only.

SUMMARY OF THE INVENTION

The present picture viewer, in one form thereof, comprises, generally, a base 10 having a cavity 11, a sequential picture changer 12 adapted to be replaceably housed in said cavity, an upper tubular extension 13 preferably removably mounted on said base and, at its upper end, being closed by an enlarging lens 14, and means 15 carried by the extension 13 to illuminate the top picture of a stack thereof in the sequential picture changer so it may be viewed through said lens, and, alternatively with the changer, single-print holders or adapaters 16 adapted to be slid into said cavity one at a time, to illuminate prints mounted thereon for viewing through said lens 14.

In a second form, the base 10a has a cavity 11a for holding a stack of prints and is provided with means 17 for feeding said prints sequentially to viewing position, each pring being displaced by the next print of said stack that is so fed. This latter form of the invention is also provided, as before, with a removably mounted tubular extension 13a with a lens 14, and illuminating means 15.

In the drawings, like reference characters designate similar parts in the several views.

BRIEF DESCRIPTION OF THE DRAWINGS

FIG. 1 is a partly broken side elevational view of one preferred form of picture viewer according to the invention and provided with a sequential picture changer.

FIG. 2 is a rear elevational view thereof.

FIG. 3 is an enlarged vertical sectional view as taken on the line 3—3 of FIG. 1 with said changer in contacted position.

FIG. 4 is a similar view with the changer in extended position.

FIG. 5 is a partly broken and partly sectional plan view of the base and a sequential picture changer therein, as shown in FIGS. 1, 3 and 4, and in an intermediate position.

FIG. 6 is a partly broken plan view of a second preferred form of viewer.

FIG. 7 is a longitudinal sectional view as taken on the line 7—7 of FIG. 6.

FIG. 8 is a fragmentary plan sectional view as taken on the plane of the line 8—8 of FIG. 7.

FIG. 9 is a plan view of a print-holding adapter for feeding single prints to the viewer, as a replacement for the picture changer.

DESCRIPTION OF THE PREFERRED EMBODIMENTS

The base 10 of the viewer shown in FIGS. 1 to 5 is generally rectangular, having a front wall 20, a rear wall 21, side walls 22 and 23, and a top wall 24, the latter being preferably disposed at an angle sloping upwardly at the rear, and having a central rectangular opening 25 that frames a print in said base. A frame wall 26 guides the position of the extension 13 of the base. The cavity 11 is defined between the top wall 24 and a parallel wall 27 spaced above the bottom of the base, the upper end of the side wall 22 closing one end of said cavity, the other end being open for insertion of a picture changer 12 or a print holder 16. To facilitate such insertion and, particularly, removal of items 12 or 16, a finger recess 28 is provided in the top wall 24. Said base, below the wall 24, is provided with a picture-storing space 29a which may have a desired height according to the storage capacity desired.

The extension 13 is shown as of rectangular form, the lower end 29 being proportioned to fit within the frame wall 26 and to approximately coincide with the opening 25 in the base, and the upper end 30 being widened side-to-side and narrowed front-to-back. The extension 13 is forwardly sloped, since it is normal to the plane of the sloping top wall 24, the enlarging lens 14 being mounted in the extension end 30 for better accommodation for the viewer. Said extension may be differently proportioned, as desired.

The picture-illuminating means 15 comprises a housing 31 within the hollow of which is mounted an electric light 32 (best seen in FIG. 8) thta is backed by a reflector 33, the reflected light from which is directed through an opening 34 in the wall of the extension 13 on which said housing is removably mounted. A frame wall 35 holds the light housing in position and so it may be readily removed for replacement of the light 32.

The sequential picture changer 12 is shown as a rectangular frame 36 of a size to have a sliding fit in the cavity 11, the wall 27 being shown with springs 37 that engage the bottom of said frame to bias the same into engagement with the top wall 24 of the base so the frame opening 38 is in substantial register with the opening 25 of said wall 24. In practice, said frame 36 is provided with a bottom wall 39 against which the mentioned springs 37 press, said wall being removable, hinged or otherwise engaged with said frame so the same may be opened to admit insertion of a stack or pack of pictures 40 into the frame. Spring fingers 41 on said wall 39 lightly press the stack against the bottom face of the frame 36 so the top picture of said stack is framed in the opening 25 of the base, is illuminated by light from the means 15, and is viewable through the lens 14.

Said picture changer is shown as having a U-shaped shuttle or slide 42 mounted in said frame 36 and manually movable by means of a grip portion 43, back and forth in a shuttle or reciprocative movement, to remove the topmost picture from the stack and replace the same at the bottom of said stack. Arms 44 at the sides of the shuttle 42 are devised for abutment engagement with the far end of the topmost picture and to slide the same with the shuttle as the latter is extended to the position of FIG. 4, at which position the picture 40a will, at its forward end, drop on a ledge 45 on the shuttle 42 and, at its rearward end, upon a pair of lead-in projections 46. By pushing on the shuttle end 43 toward the viewer, the picture 40a is guided by the slope of the projections 46 beneath the stack and between the stack and the spring fingers 41. Now, the next picture of the stack is exposed and may be viewed, as above described. Thus, by successive reciprocations of the shuttle, the pictures 40 are sequentially exposed for viewing through the lens 14, which imparts to them a three-dimensional effect while at the same time providing an opportunity to independently view the displaced picture 40a and give access thereto for removal and/or replacement by another picture, before return thereof to the bottom of the stack 40.

The viewer may be used for viewing single pictures placed in the cavity 11, one at a time. The sequential picture changer 12 is removed so the cavity 11 may accept the single-print holder 16 that has the same length, width and height dimensions as the frame 36 of the changer 12. The holder 16, shown in FIG. 9, may comprise a plate part 47 with two or more corner pieces 48 for engaging the corners of a print or picture 40b to hold the same flat, and having flanges 49 that serve as support legs that may be engaged by the springs 37 of the wall 27 to bias the holder 16 into engagement with the under face of the base wall 12. Thus, the picture 40b may be held in proper position to be viewed through the lens 14.

The viewer that is shown in FIGS. 6 to 8 has its base 10a elongated with the opening 25 offset to the rear, remote from the front opening of the cavity 11a. The tubular extension 13a generally is similar to the extension 13 but is shown shorter, with the lens 14 at the upper end thereof more closely located with respect to the opening 25. The illuminating means 15 is similar to the means above described and has the same purpose, of illuminating a picture framed by said opening 25. In this form, print-feeding means 17 is provided in the base 10a forward of the extension 13a, the same being adapted to manually and successively feed prints to lens-viewable position framed in the opening 25 from a stack 40c thereof.

In this case, the feeding means 17 is shown as a pair of friction rollers 50 on a transverse shaft 51 extending downwardly through openings 52 in the top wall 24a of the base 10a, a pinion gear 53 on the outside of one of the shaft bearings 53a, and a manually rotatable and larger gear 54 in mesh with the pinion gear 53 and mounted on a bearing 55 at one side of the base. While shown at the side of the viewer that has the illuminating means, the gears 53 and 54 may be placed at the other side or at both sides, for convenience of manipulation.

The stack of pictures 40c is inserted into the cavity 11a, upwardly-biasing spring fingers 56 pressing the forward edge of the stack into firm contact with the rollers 50, as can be seen in FIG. 7. Rearward of the rollers and applied to or provided on each of the side walls 22a, there is a thickened portion 57, a slot 58 being defined between the top edge of said portion 57 and the under face of said base wall 24a. As shown in FIG. 8, the prints have their side edges extending laterally past the inner faces of said thickened portions 57. The latter portions are each provided with an upwardly and rearwardly sloping front edge 59 which constitutes a position-limiting stop for the stack of prints when being inserted into the viewer. A cover 60 may be provided to enclose the drive rollers and their mounting shaft.

By turning the gear 54 forwardly, the rollers 50 turn in a direction to move the topmost print of the stack 40c to viewing position. As said movement begins, the forward corners of said print are guided by the sloping edges 59 into the slots 58. Thus, when the feed movement is completed and the print 40d has lost contact with the rollers, the same is held in viewable position, as shown, by engagement of its side edges in said slots 58. The next print that is thus fed to viewing position will displace the print 40d to drop at the rear of the viewer or, if desired, into a suitable collecting receptacle.

While the foregoing has illustrated and described what are now contemplated to be the best modes of carrying out the invention, the constructions are, of course, subject to modification without departing from the spirit and scope of the invention. Therefore, it is not desired to restrict the invention to the particular forms of construction illustrated and described, but to cover all modifications that may fall within the scope of the appended claims.

Having thus described the invention, what is claimed and desired to be secured by Letters Patent is:

1. A print viewer comprising:
   (a) a base having a top wall with a rectangular opening therein, and a parallel wall spaced beneath said top wall and defining a rectangular cavity open at one end of the base,
   (b) means disposed in said cavity for holding at least one print in general register with said opening,
   (c) a tubular upwardly directed extension joined to said base and having a rectangular lower end coinciding with and enclosing said opening in the top wall of the base,
   (d) an enlarging lens mounted across the upper end of the extension,
   (e) means carried by a wall of the extension to illuminate the exposed surface of a print framed in said top opening,
   (f) said print being one of a stack of prints disposed in register with the opening in the top wall of the base, and
   (g) means to sequentially move the top prints of said stack from a framed position outwardly through the open end of the cavity to sequentially expose the prints therebeneath to the illuminating means.

2. A print viewer according to claim 1 in which the latter means includes means to return such moved prints sequentially to the bottom of the stack.

3. A print viewer according to claim 1, including an adapter for mounting said print, the same being slidably engageable in the base cavity, and means to limit the position of said adapter to frame the print in the mentioned top opening in the base.

References Cited

UNITED STATES PATENTS

| | | | |
|---|---|---|---|
| 2,223,334 | 11/1940 | Robison | 40—78 X |
| 2,580,164 | 12/1951 | Flynn. | |
| 2,617,218 | 11/1952 | Antos | 40—79 |
| 2,740,326 | 4/1956 | Reinbach | 40—78 X |
| 3,247,757 | 4/1966 | Callaghan | 40—79 X |
| 3,377,727 | 4/1968 | Weggeland | 40—79 |

FOREIGN PATENTS

| | | |
|---|---|---|
| 1,033,286 | 4/1953 | France. |
| 173,096 | 7/1906 | Germany. |

EUGENE R. CAPOZIO, Primary Examiner

R. CARTER, Assistant Examiner

U.S. Cl. X.R.

40—106.1